United States Patent Office 3,471,362
Patented Oct. 7, 1969

3,471,362
STARCH AND GUM ADDITIVE COMPOSITIONS AND USE THEREOF IN PAPERMAKING PROCESSES
Sheldon E. Kent, Winnetka, Ill., assignor to Hodag Chemical Corporation, Chicago, Ill., a corporation of Illinois
No Drawing. Continuation-in-part of application Ser. No. 98,001, Mar. 24, 1961. This application Apr. 28, 1967, Ser. No. 634,506
Int. Cl. D21d 3/00; D21h 3/28
U.S. Cl. 162—178                10 Claims

ABSTRACT OF THE DISCLOSURE

Starch and gum additives for use particularly in the production of paper comprising reaction products of starch or gums with acid addition salts of unsubstituted long chain aliphatic amines, and production of paper having enhanced strength by utilization of said additives.

---

This application is a continuation-in-part of application Ser. No. 98,001, filed Mar. 24, 1961 now abandoned.

This invention is directed to new and useful starch additive and gum additive compositions which have particular utility in paper making processes and to paper making processes utilizing such novel additive compositions.

It has long been conventional practice in the preparation of paper of various types, as well as in the sizing of paper and in the preparation of coatings for paper, to utilize starch additions and gum additions as, for instance, pearl starches derived from corn starch, wheat starch, tapioca starch and potato starch; and gums such as locust bean gum and guar gum, and the like. In the production of paper utilizing such starches and/or gums, the same are added to the paper producing system at any suitable place as, for instance, at the wet-end, for example, at the beater, in the head-box, or at the fan pump or regulator box. The starch and/or gum additions serve a variety of functions as, for instance, to enhance tensile strength and for other functions as well such as improvements in sheet formation and retention of fillers and fines.

It has been found, in accordance with the present invention, that if the starch or gum, which may, for instance, be any of the types referred to above, is admixed, preferably in the form of an aqueous slurry, with certain chemical compounds and heated or cooked therewith, the resulting starch or gum compositions have materially improved properties and characteristics which result in substantially increasing their utility in paper making procedures over the untreated starch or gum. Such enhanced utility manifests itself in a number of improvements, particularly in relation to tensile strength, tear strength, and analogous properties in the finished paper.

The starches which are used for the purposes of the present invention are the so-called unmodified starches, that is, they are of the type which have not undergone such treatments as oxidation, acid treatment, or chemical modifications as, for instance, by esterification or etherification. Pearl starches and Globe Starch 3001, Corn Products Refining Company, are typical examples of unmodified starches. However, partially dextrinized starches can also be used pursuant to my invention, but it is especially advantageous to use unmodified starches. With regard to the gums, those which can be used in the production of the additives in accordance with this invention are the types which are commonly used as such in paper making processes to impart strength properties thereto. These include deacetylated karaya gum but especially the galacto-mannan types of gums exemplified by guar and locust bean gum.

The chemical compounds which are reacted with the aforesaid starches and/or gums comprise long chain primary amine salts, especially fatty diamine salts, in which the long chain or fatty radical contains at least 8 and, more desirably, at least 16 and up to about 26 carbon atoms. Typical of such higher long chain amines, which are unsubstituted and which consist of carbon, hydrogen and nitrogen, which are utilized in the form of the acid addition salts thereof, as pointed out hereafter, are octyl amine, nonyl amine, decyl amine, undecyl amine, dodecyl amine, tetradecyl amine, hexadecyl amine, oleyl amine, octadecyl amine, soya amines, tallow amines, soya amine-propyl amines, and, more particularly, dodecyl diamine, tetradecyl diamine, hexadecyl diamine, octadecyl diamine, soya diamines, and tallow diamines. The aforesaid amines are utilized, as stated, in the form of salts thereof, such as the hydrochloride, the acetate, propionate, nitrate, sulfate, and the like. It is particularly desirable to utilize these compounds in the form of their acetate salts and especially satisfactory, although forming but one embodiment of the present invention, is the utilization of tallow diamine acetate salt. This latter compound is normally a viscous paste at room temperature. In its utilization in accordance with the present invention, it may be employed on the 100% basis but, more conveniently, it is used in the form of an aqueous solution, for instance, a 15% to 20% solution in water.

In the preparation of the starch additive or gum additive compositions of the present invention, it is desirable, as indicated above, to admix the starch or gum, in the form of an aqueous slurry or dispersion or solution, as the case may be, with the long chain primary amine salts, utilizing a minor proportion of the latter, and then to heat or cook the mixture at an elevated temperature as, for instance, 160–195 degrees F. and particularly at 180–190 degrees F., a cooking period of 5 to 10 minutes being usually quite satisfactory. Heating at too high a temperature or for too long a period of time causes overcooking and should be avoided.

The proportion of long chain primary amine salt, based on the weight of the dry starch or gum, is variable and will usually range from about 2% to about 5%, 6% or 7%, although higher proportions of the long chain primary amine salt can be used but are usually unnecessary. Under the conditions of heating or cooking, the long chain primary amine salts coact with the starch or gum to modify the nature and characteristics thereof in a manner which is not fully understood but which readily manifests itself in the radically different way in which the reaction product functions in relation to the functioning of the untreated starch or gum.

The amount of the starch- and gum-long chain amine salt reaction product utilized in the paper making process is variable, depending upon the particular strength and characteristics, both tensile and tear, and other properties desired to be imparted to the paper in any given instance. In general, when employed as a wet-end additive, from about 0.25% to about 4%, based on the dry furnish, is typical. The percentages, however, are, as indicated, variable and may be substantially in excess of the ranges set forth below. Ordinarily, however, the aforesaid ranges will encompass those which would usually be utilized.

Mixtures of the starch-long chain primary amine salt reaction product and the gum-long chain primary amine salt reaction product can be utilized. To this end, the said reaction products can be separately made and added, with or without prior admixture, to the paper stock pulp in the paper making process. Alternatively, a mixture can be made of the starch and the gum and said mixture can be reacted, in aqueous medium, with the long chain primary amine salt, and the resulting reaction product or mixed starch gum additives added to the paper stock pulp.

The following examples are illustrative of the practice of the present invention. It will be understood that various changes may be made with respect to the selection of different starches, different long chain primary amine salts, proportions of ingredients utilized, and in other respects, all of which will be apparent to those skilled in the art in the light of the guiding principles and teachings set forth herein.

Example 1

(a) 3 gallons of a 20% aqueous solution of tallow diamine acetate salt were mixed with cold water and there were added thereto 300 pounds of starch (Globe Starch 3001, Corn Products Refining Company), to produce a mixture having a content of 3% of starch. It was cooked at 190 degrees F. for 10 minutes.

(b) The slurry produced in part (a) hereof was used in the production of a 70 lb. unbleached kraft paper, being employed at the wet-end in an amount equal to 15 pounds of slurry per ton of pulp. Materially higher tensile, tear and Mullen values were obtained in the finished paper over those obtained with an untreated starch.

Example 2

(a) A pearl starch-tallow diamine acetate salt, containing 1% tallow diamine acetate salt solids, was prepared in the manner described in part (a) of Example 1.

(b) The said reaction product of part (a) hereof was incorporated into a 100% kraft stock pulp, plus the usual rosin size and alum additions, in the proportions and with the results set out below.

| Amount, lb./ton | Percent | Basis wt. | Tensile | Tear | Mullen | Points increase over blank |
|---|---|---|---|---|---|---|
| Blank | | 62.2 | 17.2 | 163 | 22.5 | 0 |
| 5 | ¼ | 61.7 | 16.6 | 204 | 26.5 | 4 |
| 10 | ½ | 62.9 | 20.6 | 207 | 27.5 | 5 |
| 20 | 1 | 62.4 | 20.8 | 210 | 28.5 | 6 |

The utilization of the starch-tallow diamine acetate salt reaction product produced marked increase in burst strength and tear strength over the utilization of an untreated starch. The Mullen, at the ¼% level, showed an increase of 17.8% as compared with the blank in which an untreated starch was used; and, at the 1% level, the Mullen showed an increase of 26.7% as compared with the blank. The increase of the tear strength over the blank was of the order of 27%.

Example 3

(a) A 4% tapioca starch slurry was admixed with 11%, by weight, of a 20% aqueous solution of tallow diamine acetate salt, based on the tapioca starch solids, and cooked at 195 degrees F. for 10 minutes. After cooling, the starch solution was diluted to 1% solids.

(b) 400 grams (A.D.) of an ivory spinning kraft paper pulp were beaten in a laboratory beater to 422 cc. C.S.F. Handsheets of the beaten pulp were made by standard procedures (Tappi Standard Method T205m 58) and tested by conventional procedures (Tappi Standard Method T220m 53). A recirculating British sheet mold was used to form handsheets. The first 15 handsheets of each set were discarded to allow the white water to come to equilibrium, and the following seven were utilized for testing. The pH of the white water in the sheet mold was controlled with alum and ½% Amrez were added to the stock before it was diluted in the sheet mold. The starch-tallow diamine acetate salt reaction product produced in part (a) of this example was added to the sheet mold after the final dilution of the stock. The following table shows the results of the test.

| Starch addition, percent of fibre | Basis wt. (lbs./3,000 sq. ft.), bs. wt. | Burst factor (lbs./sq. in.), bs. wt. | Tensile factor (lbs./in.), bs. wt. | Tear factor (force in g.), bs. wt. |
|---|---|---|---|---|
| Control, no starch | 38.55 | 1.70 | 0.84 | 2.08 |
| 2.1 | 43.56 | 1.89 | 0.72 | 1.84 |
| 1.4 | 39.99 | 1.90 | 0.86 | 1.74 |

Example 4

3 gallons of a 20% aqueous solution of tallow diamine acetate salt were mixed with cold water and there were added thereto 100 pounds of guar gum to produce a mixture having 1% of guar gum. It was cooked at 190 degrees F. for 10 minutes. The resulting additive was incorporated into a pulp stock for the production of an unbleached Kraft paper in an amount of 0.2% per ton of pulp. Materially higher tensile and tear strengths were obtained in the finished paper over those obtained with untreated guar gum.

The novel starch and gum additive compositions of the present invention can also be used, with advantages, in place of conventional starch and gum products in sizings and in coating compositions for use in the production of papers and allied products, in textile and other cellulosic products, and for coagulating and flocculating applications in paper making processes, water treatment and similar or analogous environments.

I claim:

1. A method of preparing an additive composition for use in paper making processes which comprises mixing (a) one or more of unmodified starch, partially dextrinized starch, deacetylated karaya gum, and a galactomannan gum in an aqueous medium with (b) a minor percentage of an acid addition salt of a long chain aliphatic amine, said amine being unsubstituted and consisting of carbon, hydrogen and nitrogen, said mixture consisting essentially of the aforesaid (a) and (b) ingredients as reactants, and heating the resulting mixture at elevated temperature, to effect reaction of said (a) and (b) ingredients.

2. A method according to claim 1, in which said amine is a diamine.

3. A method according to claim 1, in which said amine salt is a tallow diamine acetate salt, and in which the heating is carried out at a temperature of about 185 to 195 degrees F. for about 5 to 10 minutes.

4. A method according to claim 2, in which the gum is selected from the group of locust beam gum and guar gum.

5. A starch additive for the preparation of improved paper which comprises a reaction product of a mixture consisting essentially of (a) one or more of unmodified starch, partially dextrinized starch, deacetylated karaya gum, and a galacto-mannan gum, and (b) an acid addition salt of a long chain aliphatic amine, said amine being unsubstituted and consisting of carbon, hydrogen and nitrogen, in an aqueous medium at elevated temperatures.

6. An additive according to claim 5, in which the amine is a diamine.

7. An additive according to claim 5, in which the starch is a pearl starch, the amine salt is a tallow diamine acetate salt, and in which the reaction is carried out at a temperature of about 185 to 195 degrees F. for about 5 to 10 minutes.

8. A starch composition for strengthening paper consisting essentially, as reactants, of (a) gelatinized unmodified starch and (b) an acid addition salt of a long chain aliphatic amine, of from 12 to 26 carbon atoms, said long chain aliphatic amine being unsubstituted and consisting of carbon, hydrogen and nitrogen, said composition having been formed, by cooking in water, a starch in the presence of said acid addition salt of said long chain aliphatic amine at a temperature of about 185–195 degrees F. to effect gelatinization of the starch.

9. In a method of improving the strength characteristics of paper, the steps which comprise admixing with the paper stock a minor percentage of a reaction product consisting essentially of (a) a cooked starch- and/or gum and (b) a long chain aliphatic amine acid addition salt, said amine being unsubstituted and consisting of carbon, hydrogen and nitrogen, said starch being selected from the group of unmodified and partially dextrinized starch, and said gum being selected from the group of deacteylated karaya gum and galacto-mannan gums, and forming the paper from the thus treated paper stock.

10. A method according to claim 9, in which the amine is a diamine.

References Cited

UNITED STATES PATENTS 3,225,028   12/1965   Nordgren _____ 162—178 X
3,320,118   5/1967   Black et al. _____ 162—175

S. LEON BASHORE, Primary Examiner

A. C. HODGSON, Assistant Examiner

U.S. Cl. X.R.

127—33; 162—175; 260—233.3